United States Patent
Booth et al.

(10) Patent No.: US 6,299,350 B1
(45) Date of Patent: Oct. 9, 2001

(54) THERMOMETER

(75) Inventors: Vicki R. Booth; Alan J. Mellinger, both of Portland, OR (US)

(73) Assignee: Comark Instruments, Inc., Beaverton, OR (US)

( * ) Notice: Subject to any disclaimer, the term of this patent is extended or adjusted under 35 U.S.C. 154(b) by 0 days.

(21) Appl. No.: 09/502,165

(22) Filed: Feb. 11, 2000

(51) Int. Cl.$^7$ .................................................. G01K 1/14
(52) U.S. Cl. ........................... 374/208; 374/1; 374/198; 116/221
(58) Field of Search .................................. 374/208, 205, 374/204, 200, 198, 199, 1; 116/221, 216

(56) References Cited

U.S. PATENT DOCUMENTS

| | | | |
|---|---|---|---|
| D. 308,343 | 6/1990 | Aloise et al. | D10/57 |
| D. 383,682 | 9/1997 | Swanson | D10/57 |
| 2,833,149 | * 5/1958 | Aldridge et al. | 374/205 |
| 2,918,819 | * 12/1959 | Freeman | 374/200 |
| 3,357,251 | * 12/1967 | Harrison | 374/204 |
| 4,595,301 | * 6/1986 | Taylor | 374/208 |
| 4,950,085 | * 8/1990 | Horvath | 374/208 |
| 5,775,488 | 7/1998 | Vaught | 206/306 |
| 6,033,110 | * 3/2000 | O'Neill | 374/208 |
| 6,039,177 | * 3/2000 | Swanson et al. | 374/208 |

OTHER PUBLICATIONS

Thermostatic Controls, Westinghouse Electric and Mfrg. Co., Brochure B–3344, p. 9, (Sep. 1995).*

* cited by examiner

*Primary Examiner*—Diego Gutierrez
*Assistant Examiner*—Stanley J. Pruchnic, Jr.
(74) *Attorney, Agent, or Firm*—John Smith-Hill; Smith-Hill and Bedell

(57) ABSTRACT

A thermometer includes a probe portion having a central axis, an adjustment member secured to the probe portion in a manner preventing relative rotation thereof, and a dial portion which is rotatable relative to the probe portion about the central axis thereof for calibrating the thermometer. The adjustment member is a nut having lobes whereby torque can be applied to the adjustment member by hand for effecting relative turning movement of the probe portion and the dial portion without use of a turning tool.

5 Claims, 1 Drawing Sheet

THERMOMETER

BACKGROUND OF THE INVENTION

This invention relates to a thermometer.

One popular form of thermometer includes a bimetallic sensing element disposed in a metal tube which allows the sensing element to be placed in an environment in which temperature sensing is desired. A dial case mounted at one end of the tube contains a scale. A pointer coupled to the sensing element traverses the scale to provide an indication of temperature sensed by the sensing element.

The angular position of the dial case relative to the tube can be adjusted in order to change the relative positions of the indicator and the scale and thereby calibrate the thermometer. A spring biased friction engagement secures the dial case and the metal tube in their adjusted relative positions. The slip joint that permits relative rotation between the tube and the dial case is relatively tight to prevent the entrance of contaminants and the dial case is relatively small for portability and convenience. Consequently, it is difficult for the user to calibrate the thermometer in the field without having access to suitable tools.

SUMMARY OF THE INVENTION

According to the present invention there is provided a thermometer comprising a probe portion having a central axis, an adjustment member secured to the probe portion in a manner preventing relative rotation thereof, and a dial portion which is rotatable relative to the probe portion about the central axis thereof for calibrating the thermometer, wherein the adjustment member is a nut having lobes whereby torque can be applied to the adjustment member by hand for effecting relative turning movement of the probe portion and the dial portion without use of a turning tool.

The lobes of the nut can be gripped to facilitate turning of the dial portion relative to the probe portion by hand, without need for a turning tool.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 2:
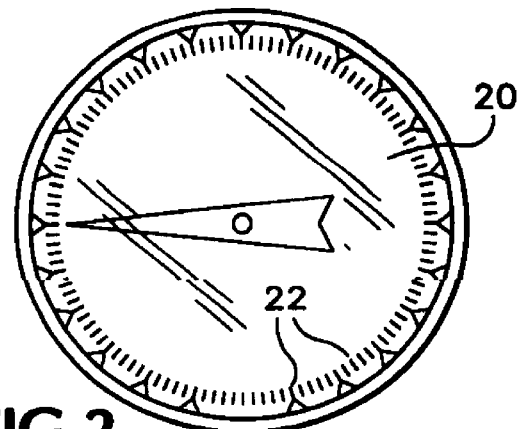
FIG. 2 is a top plan view of the thermometer.
Figure 4:
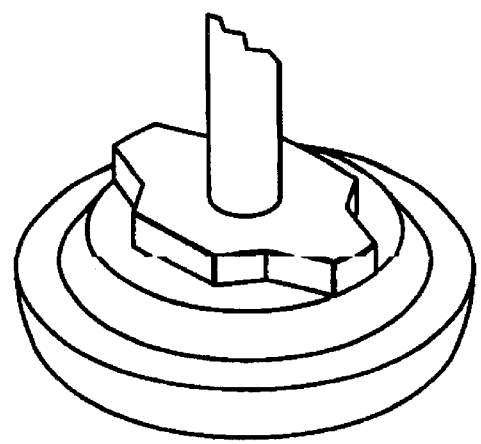
FIG. 4 is a perspective view of the thermometer shown in FIG. 1 in inverted orientation and illustrates an adjustment nut.
Figure 1:
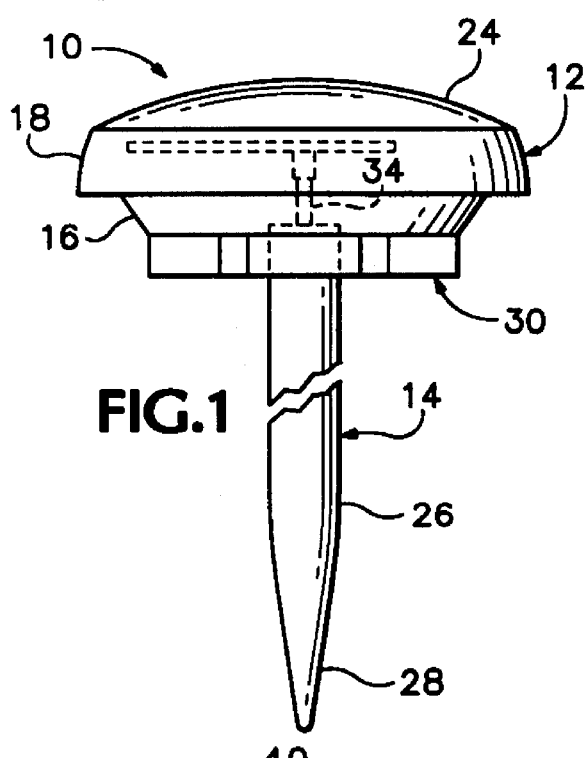
FIG. 1 is a side view of a thermometer in accordance with the present invention.
Figure 5:
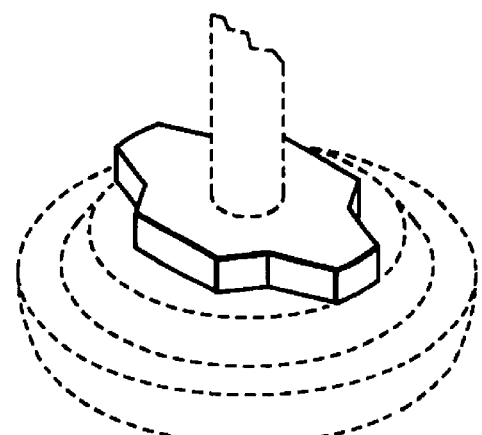
FIG. 5 is a perspective view of the adjustment member, part of the adjustment member being obscured.
Figure 3:
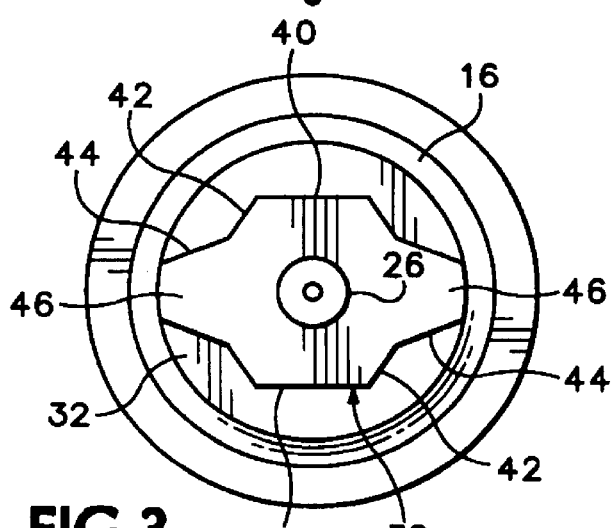
FIG. 3 is a bottom plan view of the thermometer.
Figure 6:
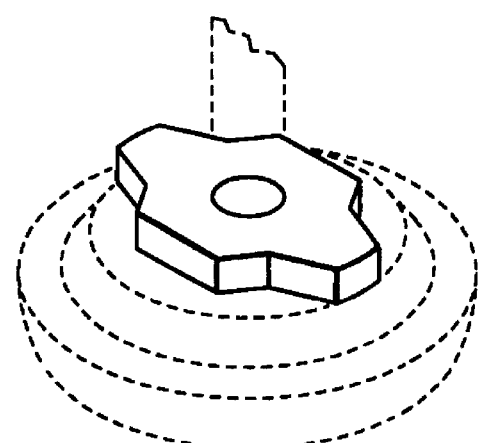
FIG. 6 is a perspective view of the entire adjustment member.

The thermometer 10 illustrated in FIGS. 1–6 comprises a dial case assembly 12 and a probe assembly 14 which are slidably joined to one another in known fashion to provide a mechanism for adjustment or calibration of the thermometer. The dial case assembly 12 comprises a case wall 16 including a peripheral flange 18. Referring to FIG. 2, the dial case assembly 12 includes an annular dial plate 20 having graduations 22 marked around its peripheral margin. The graduations 22 can be viewed through a domed transparent circular cover 24.

The probe assembly 14 comprises a tube 26 having a closed and pointed lower end 28. The tube 26 has an upper end closely received in a central opening in an adjustment nut 30 and fixed thereto by welding or other attachment method. The upper end of the tube 26 extends through the inner flat annular section 32 of the case wall 16, into the interior of the dial case. The thermometer further includes an interconnection bushing (not shown) composed of a lower cylindrical sleeve secured in the internal bore of the tube 26 and an upper flange positioned above the annular section 32 of the case wall 16 but beneath the dial plate 20. The annular section 32 is held with a relatively tight frictional engagement between the adjustment nut 28 and the interconnection bushing, such that foreign matter is effectively sealed from the interior of the dial case, but the manner of engagement allows relative rotational movement of the dial case assembly 12 and the probe assembly 14 when oppositely directed torques are exerted thereupon.

The probe assembly 14 further includes a central shaft 34 which is connected to one end of a bimetallic sensing element (not shown). The other end of the bimetallic sensing element is secured to the interior surface of the tube 26. As the temperature of the bimetallic element changes, the angular position of the shaft 34 relative to the tube 26 changes. The upper end of the shaft extends through a journal section of the interconnection bushing and a central opening in the dial plate 20. A transversely-extending pointer is secured to the upper end of the shaft 34 and overlies the dial plate. For a given angular position of the dial case assembly relative to the probe assembly 14, the angular position of the pointer changes as the temperature of the bimetallic element changes. It will be apparent that for a given temperature condition to which the bimetallic element is exposed, relative rotation between the dial case assembly 12 and the probe assembly 14 will alter the relative angular positions of the pointer and the dial plate and thus alter the temperature indicated by the pointer, allowing calibration of the thermometer.

U.S. Pat. No. 5,775,488, the entire disclosure of which is hereby incorporated by reference herein, discloses a thermometer which is similar to the thermometer as thus far described. In U.S. Pat. No. 5,775,488, the adjustment nut is a hexagonal nut having six flats. Most users of the thermometer disclosed in U.S. Pat. No. 5,775,488 find it difficult or impossible to turn the probe assembly relative to the dial case assembly with unaided finger pressure and accordingly a wrench or other tool is required in order to calibrate the thermometer.

In the case of the thermometer shown in FIGS. 1–6, the adjustment nut 30 is in the form of a wing nut having substantially flat peripheral surfaces.

The nut has two parallel flats 40 meeting adjacent flat surfaces 42 of the nut at an interior angle of 120°, as in a conventional hexagonal nut, but the surfaces 42 are shorter than the flats 40 and do not meet adjacent flats at an interior angle of 120° but meet flanks 44 of lobes 46 at an interior angle of about 215°. The lobes 46 are relatively narrow and long, allowing the user to apply torque to the nut with the thumb and forefinger of one hand while holding the dial case assembly against rotation in the other hand, so that finger pressure can be used to turn the nut relative to the dial case assembly without aid of a tool.

In order to apply sufficient torque to the wing nut with the thumb and index finger of one hand, the flanks of the wing nut should be as nearly radial as possible and they should have a radial extent of at least about 2.5 mm. In the case of the illustrated embodiment of the invention, the flanks of each lobe are at an angle of less than about 35° to each other and are accordingly at an angle of less than about 17.5° relative to the radius that bisects the angle between the flanks of the lobe.

On the other hand, in order to facilitate cleaning of the thermometer and prevent contaminants being trapped where the flanks 44 meet the surfaces 42, the exterior angle at the vertex where the flank 44 meets the surface 42 should be at least about 135°, and preferably at least 145°.

It will be appreciated that the invention is not restricted to the particular embodiment that has been described, and that variations may be made therein without departing from the scope of the invention as defined in the appended claims and equivalents thereof.

What is claimed is:

1. A thermometer comprising:

a probe portion having a central axis, an adjustment member secured to the probe portion in a manner preventing relative rotation thereof, and a dial portion which is rotatable relative to the probe portion about the central axis thereof for calibrating the thermometer, wherein the adjustment member is a nut having lobes whereby torque can be applied to the adjustment member by hand for effecting relative turning movement of the probe portion and the dial portion without use of a turning tool.

2. A thermometer according to claim 1, wherein the nut has substantially flat peripheral surfaces.

3. A thermometer according to claim 1, wherein the lobes meet adjacent peripheral surfaces of the nut at an exterior angle greater than 135°.

4. A thermometer according to claim 1, wherein the lobes have flank surfaces which meet adjacent peripheral surfaces of the nut at an exterior angle greater than 135°.

5. A thermometer according to claim 1, wherein each lobe has flat flanks which meet at an angle of less than about 35°.

* * * * *